(12) United States Patent
Chernyshev et al.

(10) Patent No.: US 9,516,335 B2
(45) Date of Patent: Dec. 6, 2016

(54) WIRELESS DISPLAY ENCODER ARCHITECTURE

(75) Inventors: Vladislav Chernyshev, St. Petersburg (RU); Andrey Efimov, St. Petersburg (RU); Evgeny Belyaev, St. Petersburg (RU); Mikhail Tsvetkov, St. Petersburg (RU)

(73) Assignee: Intel Corporation, Santa Clara, CA (US)

( * ) Notice: Subject to any disclaimer, the term of this patent is extended or adjusted under 35 U.S.C. 154(b) by 738 days.

(21) Appl. No.: 13/505,979

(22) PCT Filed: Dec. 24, 2009

(86) PCT No.: PCT/RU2009/000721
§ 371 (c)(1),
(2), (4) Date: Nov. 20, 2012

(87) PCT Pub. No.: WO2011/078721
PCT Pub. Date: Jun. 30, 2011

(65) Prior Publication Data
US 2013/0064289 A1    Mar. 14, 2013

(51) Int. Cl.
| | |
|---|---|
| *H04L 12/24* | (2006.01) |
| *H04L 9/00* | (2006.01) |
| *H04L 9/32* | (2006.01) |
| *H04N 11/04* | (2006.01) |
| *H04N 5/445* | (2011.01) |

(Continued)

(52) U.S. Cl.
CPC .......... *H04N 19/507* (2014.11); *H04N 19/124* (2014.11); *H04N 19/132* (2014.11); *H04N 19/147* (2014.11); *H04N 19/164* (2014.11); *H04N 19/174* (2014.11); *H04N 19/436* (2014.11); *H04N 19/60* (2014.11)

(58) Field of Classification Search
CPC ........ H04N 11/04; H04N 7/12; H04N 11/02; H04N 5/44; H04B 1/66; G09G 5/36; G06F 3/00; G06F 13/00
See application file for complete search history.

(56) References Cited

U.S. PATENT DOCUMENTS

| | | |
|---|---|---|
| 2003/0169264 A1 | 9/2003 | Emerson et al. |
| 2006/0093034 A1 | 5/2006 | Kim et al. |

(Continued)

FOREIGN PATENT DOCUMENTS

| | | |
|---|---|---|
| CN | 1857001 A | 11/2006 |
| CN | 1913642 A | 2/2007 |
| WO | 2009/047694 A1 | 4/2009 |

OTHER PUBLICATIONS

2nd Office Action for Chinese Patent Application No. 200908163065.5, mailed Dec. 15, 2014 (e-mail notification date Feb. 6, 2015).

(Continued)

*Primary Examiner* — Sath V Perungavoor
*Assistant Examiner* — Patricia I Young
(74) *Attorney, Agent, or Firm* — Green, Howard & Mughal, LLP

(57) ABSTRACT

A method and system may include an interface to receive a video signal and an encoder to compress the video signal on a per-slice basis. In one example, compression of the video signal involves the use (50) of a hash value and an allowable distortion of each slice to select (56) a quantization parameter for the slice. The selected quantization parameter can be used to encode (58) the slice. In addition, a processor can manage wireless transmission of the compressed video signal.

14 Claims, 2 Drawing Sheets

(51) Int. Cl.
H04B 1/66 (2006.01)
G09G 5/36 (2006.01)
H04N 19/507 (2014.01)
H04N 19/147 (2014.01)
H04N 19/60 (2014.01)
H04N 19/124 (2014.01)
H04N 19/132 (2014.01)
H04N 19/164 (2014.01)
H04N 19/174 (2014.01)
H04N 19/436 (2014.01)

(56) References Cited

U.S. PATENT DOCUMENTS

2006/0282855 A1  12/2006  Margulis
2007/0036213 A1   2/2007  Matsumura et al.
2007/0116110 A1   5/2007  Diamant et al.

OTHER PUBLICATIONS

PCT/RU2009/000721 Notification of Transmittal of the International Search Report and the Written Opinion of the International Searching Authority, or the Declaration, mailed Sep. 23, 2010, 18 pages.

Hannuksela, M. M., et al., "H.264/AVC in Wireless Environments," IEEE Transactions on Circuits and Systems for Video Technology, IEEE Service Center, Piscataway, NJ, US. DOI 10.1109/TCSVT.2003.815167, vol. 13, No. 7, Jul. 1, 2003, pp. 657-673, XP011099258, ISSN: 1051-8215, the whole document.

Sullivan, G. J., et al., "Rate Distortion Optimization for Video Compression", IEEE Signal Processing Magazine, IEEE Service Center, Piscataway, NJ, US. DOI: 10.1109/79.733497, vol. 15, No. 6, Nov. 1, 1998, pp. 74-90, XP011089821, ISSN: 1053-5888, the whole document.

"MPEG Digital Video-Coding Standards—Delivering Picture-Perfect Compression for Storage, Transmission, and Multimedia Applications", IEEE Signal Processing Magazine, IEEE Service Center, Piscataway, NJ, US. DOI: 10.1109/79.618010, vol. 14, No. 5, Sep. 1, 1997, pp. 82-100, XP011089789, ISSN: 1053-5888 p. 89, paragraph "Conditional Replenishment".

Lehtoranta, O, et al., "Feasibility Study of a Real-Time Operating System for a Multi-Channel MPEG-4 Encoder", Proceedings of the SPIE—the International Society for Optical Engineering SPIE—The International Society of Optical Engineering USA, vol. 5684, No. 1, Mar. 14, 2005, pp. 292-299, XP002600013, ISSN: 0277-786X, the whole document.

Lehtoranta, O, et al., "A Parallel MPEG-4 Encoder for FPGA Based Multiprocessor SoC", Proceedings. 2005 International Conference on Field Programmable Logic and Applications, Tampere, Finland, Aug. 24-26, 2005 (IEEE CAT. No. 05EX1155), pp. 380-385, XP002600014, IEEE Piscataway, NJ, USA, ISBN: 0-7803-9362-7, the whole document.

Lehtoranta, O, et al., "Parallel Implementation of Video Encoder on Quad DSP System", Microprocessors and Microsystems, IPC Business Press Ltd. London, GB, DOI 10.1016/S0141-9331(01)00141-7, vol. 26, No. 1, Feb. 25, 2002, pp. 1-15, XP004336357, ISSN: 0141-9331, the whole document.

Office Action and Search Report with English Translation from Corresponding Chinese Patent Application No. 200980163065.5, mailed Apr. 28, 2014, 18 pages.

"H.264 Series H: Audiovisual and Multimedia Systems—Infrastructure of Audiovisual Services—Coding of Moving Video—Advanced Video Coding for Generic Audiovisual Services", ITU-T Telecommunication Standardization Sector of ITU, Nov. 2007, the whole document.

3rd Office Action for Chinese Patent Application No. 200980163065.5, mailed May 15, 2015.

Lehtoranta, O., et al.; Feasibility Study of a Real-Time Operating System for a Multichannel MPEG-4 Encoder; SPIE Proceedings; vol. 5684, Multimedia on Mobile Devices, Mar. 14, 2005; Abstract.

4th Office Action for Chinese Patent Application No. 200980163065.5, mailed Dec. 2, 2015.

Notice of Grant for Chinese Patent Application No. 200980163065.5 mailed May 27, 2016, 4 pages.

WIRELESS DISPLAY ENCODER ARCHITECTURE

CROSS-REFERENCE TO RELATED APPLICATIONS

This patent application is a U.S. National Phase application under 35 U.S.C. §371 of International Application No. PCT/RU2009/000721, filed Dec. 24, 2009, entitled WIRELESS DISPLAY ENCODER ARCHITECTURE.

BACKGROUND

Displays may be used to present information from a wide variety of sources such as DVD (digital versatile disc) players, PCs (personal computers) and video players. Historically, such displays have required a wired connection to the source of the video signal. Such an arrangement can add to the complexity of installation and may increase component costs. While more recently, attempts may have been made to develop wireless displays, there still remains considerable room for improvement. For example, conventional techniques might involve buffering an uncompressed video signal prior to transmission and could lead to processing latencies, increased power consumption, larger chips, and relatively high bandwidth requirements.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may provide for a method in which a video signal, which might include display graphics, synthetic and natural still images, and/or motion images, is received and the video signal is compressed on a per-slice basis, wherein a slice may be a subset of picture samples for a frame. The compressed video signal might be transmitted to a wireless display or stored to a system memory for subsequent transmission.

Embodiments may also provide for a system including an interface to receive a video signal and an encoder to compress the video signal on a per-slice basis. The system can also include a processor to manage wireless transmission of the compressed video signal.

In addition, embodiments can include a method in which a video signal is received from at least one of a Digital Video Interface (DVI, e.g., DVI Specification, Rev. 1.0, Apr. 2, 2009, Digital Display Working Group), a High-Definition Multimedia Interface (HDMI, e.g., HDMI Specification, Ver. 1.3a, Nov. 10, 2006, HDMI Licensing, LLC), and a system frame buffer, wherein the video signal includes pixel data for a current frame. The method may also provide for calculating a hash value of a slice of the pixel data for the current frame based on color space components of the slice. The hash value and coordinates of the slice can be placed in a hash queue, and the slice may be stored to a slice buffer.

In one example, the slice buffer has a maximum storage size that is less than a minimum frame size of the video signal. The method can also provide for selecting a quantization parameter based on the hash value, an allowable distortion of the slice and a channel state (e.g., bandwidth). The slice may be encoded based on the selected quantization parameter.

Figure 1:
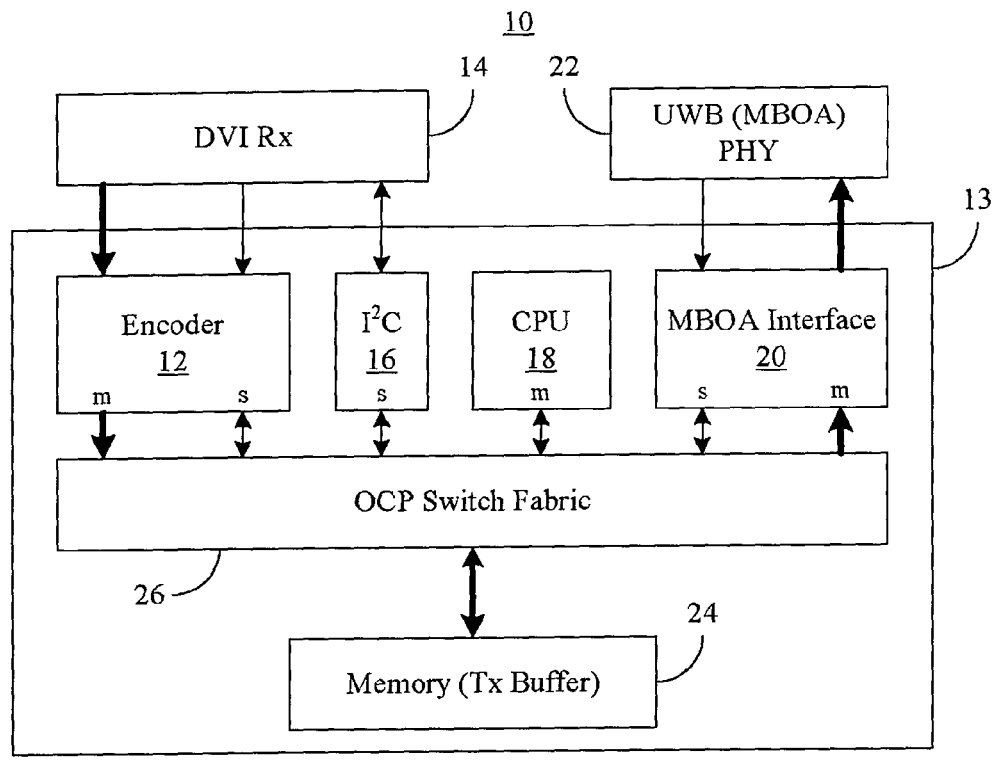
FIG. 1 is a block diagram of an example of a system according to an embodiment.

Turning now to FIG. 1, a system 10 is shown. The illustrated system 10 could be deployed in a wide variety of usage models. For example, in a DVI-UWB (Ultra-Wideband, e.g., IEEE 802.15.4a-2007) usage model, an encoder 12 may be integrated into a DVI-UWB dongle. There can be two types of dongles: a TX (transmitter) dongle and an RX (receiver) dongle. The TX dongle could be plugged to the DVI output of a PC, laptop, video player, DVD decoder or similar device. Such a TX dongle could capture a DVI source video signal, compress it and transmit it over a UWB channel. The RX dongle might be plugged to the input DVI socket of an overhead beamer, TV panel or other projecting device. The RX dongle could receive the compressed wireless video signal, decode it and generate DVI input data for a video consumer device. Together, the two dongles (TX and RX) may provide a complete video cable replacement for the short range. Thus, the encoder 12 may be integrated into a TX DVI-UWB dongle 13 as it is shown in FIG. 1. The RX TX DVI-UWB dongle, which can contain a decoder, is outside the scope of this application.

In an HDMI-WLAN (Wireless Local Area Network, e.g., IEEE 802.11n-2009) usage model, a WLAN network card may be used for wireless transmission. In addition, the input video signal can be captured from an HDMI socket of the video source (PC card, DVD player, etc).

In yet another example, a frame buffer-to-system memory usage model might be deployed. In this usage model, the encoder 12 may be a part of a computing platform such as a desktop PC (personal computer), server, laptop, PDA (personal digital assistant), wireless smart phone, imaging device, media player, mobile Internet device (MID), etc. The encoder 12 can therefore receive the video signal directly from a system frame buffer or system memory, and store the compressed video signal bitstream to the system memory. The compressed bitstream can subsequently be routed to the network device on the platform. Because the illustrated encoder 12 does not have large internal memory and it does not require external memory in order to compress the video signal, the encoder chip can be located in suitable location of the platform without losing its performance characteristics. In addition, this usage model can be used as a hardware accelerator for compression according to a standard such as H.264 (e.g., H.264, Series H: Audiovisual and Multimedia Systems, Infrastructure of Audiovisual Services—Coding of Moving Video, Advanced Video Coding for Generic Audiovisual Services, March 2009, ITU-T).

In the illustrated example of the DVI-UWB usage model, the system 10 has an interface 14 to receive a video signal, and an encoder 12 to compress the video signal on a per-slice basis. A slice may be defined as an integer number macroblocks, wherein a macroblock can be defined as a 16×16 block of picture samples ordered consecutively in a raster scan within a particular slice group. A slice group may be a particular subset of the picture samples. The division of a picture (e.g., pixel data) into slice groups is sometimes referred to as partitioning of a picture. As will be discussed in greater detail, by compressing the video signal on a per-slice basis, the illustrated encoder 12 is able to provide fast adaptation to wireless channels, high reconstructed image quality, relatively low processing latency, less power consumption, reduced bandwidth requirements, and memoryless compression that can enable small chip sizes.

The system 10 may also include a bus such as an I²C (Inter-IC, e.g., I²C Specification UM10204, Rev. 03, Jun. 19, 2007, NXP Semiconductors) bus 16, a central processing unit (CPU/processor) 18, a transmit buffer 24 of system memory, and a UWB transmission interface 20 (e.g., MBOA/Multi-Band OFDM Alliance interface) to a UWB physical layer (PHY) component 22. The components may be interconnected by an OCP (Open Core Protocol, e.g., OCP Specification 3.0, May 6, 2009, OCP-IP) switch fabric 26. In one example, the CPU 18 performs the initial configuration of the system 10 and manages wireless transmission of the compressed video signal, which may involve transfer of the compressed video signal between the encoder 12, transmit buffer 24 and MBOA interface 20 via the switch fabric 26. In particular, the encoder 12 can directly store the compressed video signal in the transmit buffer 24 and report a memory allocation table to the CPU 18. After receiving notification from the encoder 12, the CPU 18 can send transmission requests to the network card or UWB transmission interface 20.

Figure 2:
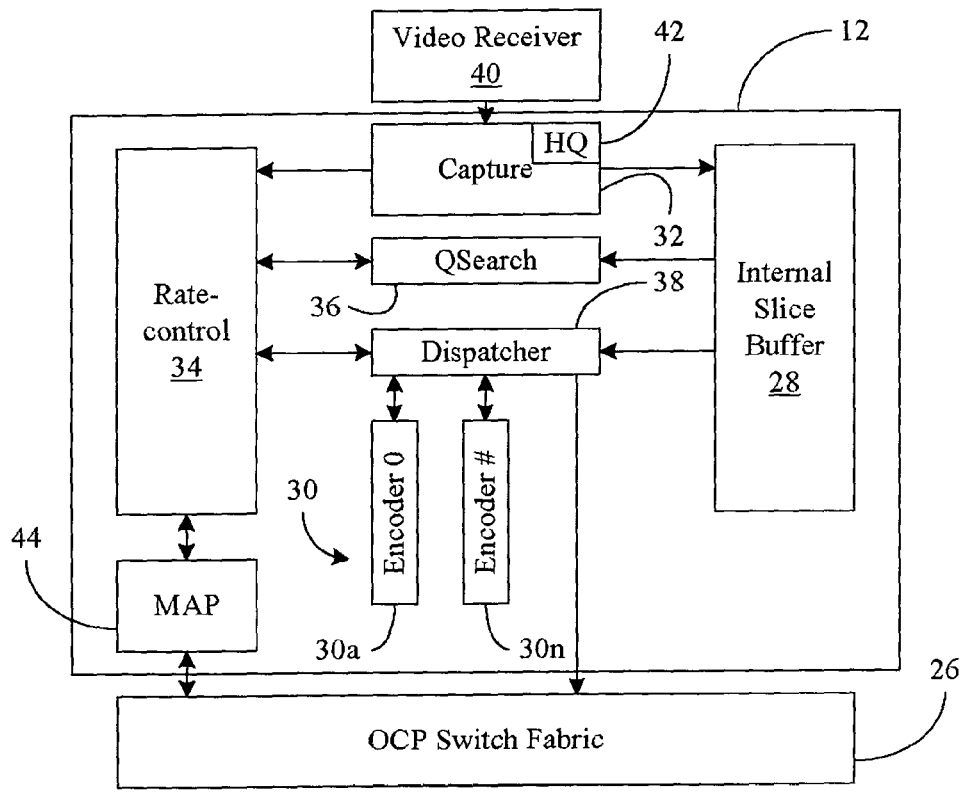
FIG. 2 is a block diagram of an example of an encoder according to an embodiment.

FIG. 2 shows one example of the encoder 12 in greater detail. Generally, there are six unique sub-modules instantiated at the top level of the encoder 12. In addition, one or several identical encoder modules 30 (30a-30n) may be used. The data-flow may start with data coming via a pixel interface to a capture module 32. After some transformations, the pixel data can be stored in an internal slice buffer 28 and hash function metrics may be sent to a rate-control module 34. The rate-control module 34 can make further decisions about necessary actions for data analysis and encoding. In the illustrated example, the rate-control module 34 uses a quantization parameter search ("QSearch") module 36 to choose an appropriate quantization parameter and a dispatcher module 38 for encoding task scheduling. The rate-control module 34 may also communicate with an external host controller such as the CPU 18 (FIG. 1) for shared buffer management. The illustrated dispatcher module 38 manages the tasks and the data flows for individual encoder modules 30 and can store the encoded data in an external memory such as the transmit buffer 24 (FIG. 1, for wireless transmission usage models). Details of the illustrated modules and components are provided below.

Internal Slice Buffer

A primary purpose of the embedded/internal slice buffer 28 may be temporal storage of RGB/YUV (red-green-blue/luminance-chrominance-chrominance) pixel data coming from the capture module 32 and providing wide access to that data for the QSearch module 36 and the dispatcher module 38. The size of buffer 28 can be enough to store several (two or more) stripes (one stripe may be sixteen sequential lines of the frame) at the same time for any of supported resolutions. The buffer 28 may have a maximum storage size, however, that is small relative to the frame (e.g., less than minimum frame size of the video signal). Accordingly, the entire frame is not stored in the illustrated approach, and the internal slice buffer 28 may not require a significant amount of real estate. The illustrated buffer 28 might be implemented in static random access memory (SRAM), dynamic RAM (DRAM), and so on.

Capture Module

The capture module 32 may receive pixel data in the RGB/YUV color space from a DVI/HDMI receiver chip in a video receiver 40 or other sub-module in the system via pixel interface, store the pixel data in the internal slice buffer 28, calculate a hash value for each slice, and store the calculated hash value in a hash queue 42. The hash value can therefore be calculated for each slice of a frame separately. In one example, all R(Y), G(U) and B(V) components of each sample are used for the hash value calculation. The result of applying the hash function to the slice may be a 32-bit value that is stored in the hash queue 42 along with the coordinates of the slice, wherein the hash queue 42 can be accessible by the rate-control module 34. The hash function values may be used by the rate-control module 34 to detect changes in the current frame in comparison with the previous one. In particular, the rate-control module 34 may compare the hash value of the slice for the current frame to the hash value of the slice for a previous frame in order to detect unchanged regions (e.g., static detection) in the video signal.

Rate-Control Module

The rate-control module 34 may select a distortion for each slice based on the hash value comparison according to a wide variety of algorithms. Generally, distortion is a metric of quality: higher allowable distortion typically results in lower quality and a smaller size of the compressed slice. Thus, the rate-control module 34 can pass the selected distortion for the slice into the QSearch module 36, wherein the QSearch module 36 may search for the appropriate quantization parameter for that slice. Simply put, the illustrated rate-control module 34 uses each hash value of a slice and an allowable distortion of the slice to select a quantization parameter for the slice. In addition, different slices in a given frame may be assigned quantization parameters with different compression rates. As a result, the illustrated approach will not introduce artifacts (blur, for example) to contour parts of an image (parts where text is present, for example), and can work equally well with display graphics, synthetic and natural still images, and motion images.

Thus, the rate-control module 34 can include the following functionality: receive hash values from the capture module 32; use the QSearch module 36 for quantization parameter estimation; decide whether a particular slice needs to be compressed (e.g., whether to skip/not compress the slice based on the hash comparison and the current channel state), and which quantization parameter to use; instruct the dispatcher module 38 to compress some of the slices and write to the appropriate output buffer; mark valid output buffers; and manage available buffer size.

QSearch Module

Typically, a larger quantization parameter may lead to lower quality and higher compression. Thus, a goal of the QSearch module 36 may be to find the largest quantization parameter value that provides a distortion that is less than or equal to the allowable distortion value selected by rate-control module 34. The Qsearch module 36 might therefore include the following functionality: obtain search tasks from the rate-control module 34; perform fast searches for appropriate quantization parameters by the given distortions for the given slices; and report calculated quantization parameter values back to the rate-control module 34.

Dispatcher Module

The dispatcher module 38 may provide a mechanism for scheduling multiple encoding processes on multiple encoder modules 30, the dispatcher module 38 can therefore get compression tasks from the rate-control module 34, choose an encoder module 30 from a pool of encoder modules to run the slice compression, and report compression completion results back to the rate-control module 34. If all encoder modules 30 are occupied, the dispatcher module 38 may wait until one of them becomes idle before assigning the compression task. In addition, the dispatcher module 38 may be responsible for resolving conflicts caused by simultaneously raised memory read/write requests by multiple encoder modules 30 to the internal slice buffer 28 and/or to external memory such as the transmit buffer 24 (FIG. 1, for wireless transmission usage models). Simply put, the illustrated dispatcher 38 uses an encoder module 30 for each selected quantization parameter, wherein the encoder module 30 encodes the slice based on the selected quantization parameter.

Encoder Modules

One or more encoder modules 30 can be used in order to perform compression tasks, wherein each encoder module 30 may perform compression of raw pixel data into a compressed video signal bitstream according to a coding process such as an H.264 process. The number of encoder modules 30 may depend on the required intensity of computations, which can depend on frame size, frame rate, and average output bit rate.

MAP Module

A primary purpose of the illustrated MAP module 44 is to facilitate the exchange of status information between the rate-control module 34 and an external host controller such as the CPU 18 (FIG. 1). Accordingly, the MAP module 44 can contain a set of registers that are visible by the rate-control module 34 and by the external host processor.

Thus, the illustrated encoder 12 may be used to provide output streams that are compatible with a wide variety of protocols and/or standards such as H.264, RGB/YUV 4:4:4, and CAVLC/CABAC (context-adaptive variable-length coding/context-adaptive binary arithmetic coding) entropy encoding. In addition, processing latencies around 0.5 ms and below at frame rates of 30/60 frames per second may be achievable. The wireless transport could provide WLAN or WPAN (Wireless Personal Area Network) goodputs of 3000 MBps (e.g., uncompressed rate of FullHD—1920×1080—at 60 frames per second) and higher. Encoder core areas may be approximately 2 mm$^2$ (e.g., using 65 nm process) and smaller, and example supported input video resolutions could include 1600×1200 and 1920×1080 and above.

Figure 3:
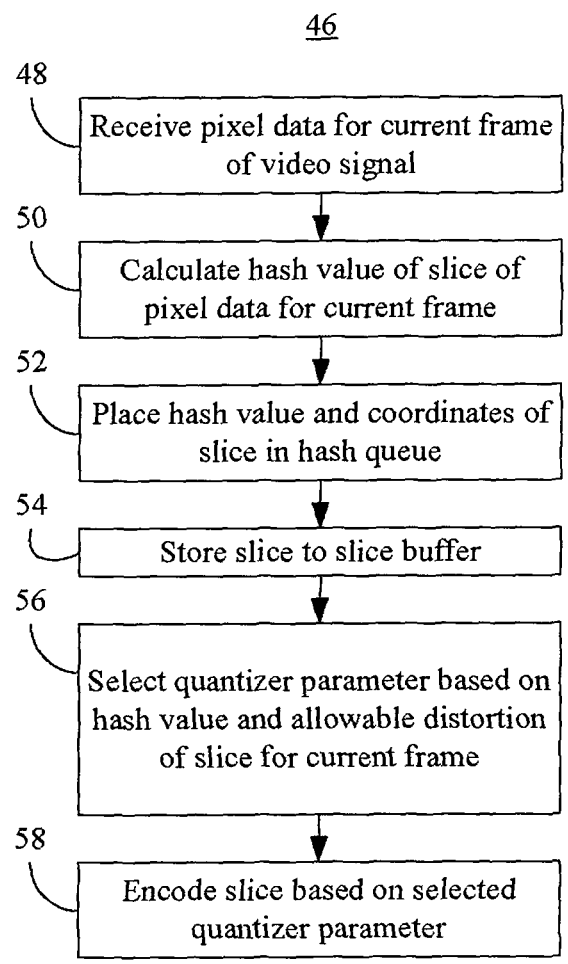
FIG. 3 is a flowchart of an example of a method of processing a video signal according to an embodiment.

Turning now to FIG. 3, a method 46 of processing a video signal is shown. The method 46 may be implemented in executable software as a set of logic instructions stored in a machine- or computer-readable medium of a memory such as random access memory (RAM), read only memory (ROM), programmable ROM (PROM), firmware, flash memory, etc., in fixed-functionality hardware using circuit technology such as application specific integrated circuit (ASIC), complementary metal oxide semiconductor (CMOS) or transistor-transistor logic (TTL) technology, or any combination thereof.

Processing block 48 provides for receiving a video signal having pixel data for a current frame. As already noted, the video signal might be received from a DVI, HDMI, system frame buffer, etc. A hash value of the slice for the current frame can be calculated at block 50, and block 52 provides for placing the hash value and coordinates of the slice in a hash queue. In addition, the slice may be stored to a slice buffer at block 54. Block 56 provides for selecting a quantization parameter based on the hash value, an allowable distortion of the slice, and the current channel state (e.g., bandwidth). The determination of the allowable distortion may involve comparing the hash value of the slice for the current frame to a hash value of the slice for a previous frame, wherein compression may or may not be required for the slice in question. In particular, in one example, compression may be limited to relatively unchanged regions of the frame. Thus, if the hash value comparison indicates no change in the incoming pixel data slice (e.g., static region of the frame), the allowable distortion for the slice in question could be decreased, which can lead to the selection of a smaller quantization parameter for the slice. By contrast, if the hash value comparison indicates a change in the incoming pixel data slice (e.g., dynamic region of the frame), the allowable distortion for the slice might be higher. Other quantization parameter selection techniques may also be used.

Block 58 provides for encoding the slice based on the selected quantization parameter. As already noted, the method 46 can be repeated for a plurality of slices of a particular frame in parallel as needed. Thus, the method 46 can provide for selecting a plurality of quantization parameters corresponding to the plurality of slices. Moreover, different slices of the same frame may be encoded with different quantization parameters and different compression rates. Thus, two or more of the corresponding plurality of quantization parameters might have different compression rates. The order in which the illustrated operations are performed may vary depending upon the circumstances.

The illustrated solution may therefore provide a unique rate-control algorithm that has fast adaptation to the wireless channel and high reconstructed image quality. Processing latency could be very low, and because the solution does not require storage of the entire compressed frame, chip size may be substantially smaller.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" is used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method comprising:
    receiving a video signal from at least one of a Digital Video Interface (DVI), a High-Definition Multimedia Interface (HDMI) or a system frame buffer, the video signal having pixel data for a current frame;
    calculating a hash value of a slice of the pixel data for the current frame based on color space components of the slice;
    calculating a second hash value of a second slice of the pixel data for the current frame;
    placing the hash value and coordinates of the slice in a hash queue;
    storing the slice to a slice buffer having a maximum storage size that is less than a minimum frame size of the video signal;
    selecting a quantization parameter based on the hash value, an allowable distortion of the slice and a channel state, wherein selecting the quantization parameter includes comparing the hash value of the slice for the current frame to a hash value of the slice for a previous frame, and wherein, when the comparison indicates no change, selecting the quantization parameter comprises decreasing the allowable distortion and, when the comparison indicates a change, selecting the quantization parameter comprises increasing the allowable distortion;
    repeating the calculating, placing, storing and selecting for a plurality of slices of the current frame in parallel to obtain a corresponding plurality of quantization parameters;
    skipping compression of the second slice based on comparing the second hash value of the second slice for the current frame to a second hash value of the second slice for the previous frame and the channel state; and
    encoding the slice with the selected quantization parameter and the plurality of slices with the corresponding plurality of quantization parameters, wherein at least two of the corresponding plurality of quantization parameters have different compression rates.

2. The method of claim 1, wherein encoding the plurality of slices includes using an encoder for each of the corresponding plurality of quantization parameters.

3. The method of claim 1, further comprising transmitting a compressed video signal comprising the compressed slice and compressed plurality of slices to a wireless display via at least one of an ultra-wideband channel or a wireless local area network (WLAN) network card.

4. The method of claim 1, further comprising storing a compressed video signal comprising the compressed slice and compressed plurality of slices to a system memory.

5. A method comprising:
    receiving a video signal having pixel data for a current frame;
    calculating a hash value of a slice of the pixel data for the current frame based on color space components of the slice;
    calculating a second hash value of a second slice of the pixel data for the current frame;
    selecting a quantization parameter based on the hash value, an allowable distortion of the slice and a channel state, wherein selecting the quantization parameter includes comparing the hash value of the slice for the current frame to a hash value of the slice for a previous frame, and wherein, when the comparison indicates no change, selecting the quantization parameter comprises decreasing the allowable distortion and, when the comparison indicates a change, selecting the quantization parameter comprises increasing the allowable distortion;
    repeating the calculating and selecting for a plurality of slices of the current frame in parallel to obtain a corresponding plurality of quantization parameters;
    skipping compression of the second slice based on comparing the second hash value of the second slice for the current frame to a second hash value of the second slice for the previous frame and the channel state; and
    encoding the slice with the selected quantization parameter and the plurality of slices with the corresponding plurality of quantization parameters to generate a compressed video signal, wherein at least two of the corresponding plurality of quantization parameters have different compression rates.

6. The method of claim 5, further comprising:
    placing the hash value and coordinates of the slice in a hash queue; and
    storing the slice to a slice buffer.

7. The method of claim 6, wherein the slice buffer has a maximum storage size that is less than a minimum frame size of the video signal.

8. The method of claim 5, wherein encoding the plurality of slices includes using an encoder for each of the corresponding plurality of quantization parameters.

9. The method of claim 5, further comprising transmitting the compressed video signal to a wireless display via at least one of an ultra-wideband channel or a wireless local area network (WLAN) network card.

10. The method of claim 5, further comprising storing the compressed video signal to a system memory.

11. The method of claim 5, wherein the video signal is received from at least one of a Digital Video Interface (DVI), a High-Definition Multimedia Interface (HDMI) or a system frame buffer.

12. A system comprising:
    an interface to receive a video signal having pixel data for a current frame;
    an encoder to calculate a hash value of a slice of the pixel data for the current frame based on color space components of the slice, to calculate a second hash value of a second slice of the pixel data for the current frame, to select a quantization parameter based on the hash value, an allowable distortion of the slice and a channel state, wherein the encoder to select the quantization parameter comprises the encoder to compare the hash value of the slice for the current frame to a hash value of the slice for a previous frame and wherein, when the comparison indicates no change, the encoder to select the quantization parameter comprises the encoder to decrease the allowable distortion and, when the comparison indicates a change, the encoder to select the quantization parameter comprises the encoder to increase the allowable distortion, to repeat the calculation and selection for a plurality of slices of the current frame in parallel to obtain a corresponding plurality of quantization parameters, to skip compression of the second slice based on comparing the second hash value of the second slice for the current frame to a second hash value of the second slice for the previous frame and the channel state, and to encode the slice with the selected quantization parameter and the plurality of slices with the corresponding plurality of quantization parameters to generate a compressed video signal, wherein at least two of the corresponding plurality of quantization parameters have different compression rates; and a processor to manage wireless transmission of the compressed video signal.

13. The system of claim 12, wherein the encoder further comprises:
- an internal slice buffer having a maximum storage size that is less than a minimum frame size of the video signal;
- a capture module having a hash queue, the capture module to calculate the hash value, place the hash value and coordinates of the slice in the hash queue, and store the slice to the internal slice buffer;
- a rate-control module to select the quantization parameter for the slice; and
- a dispatcher to use an encoder module to encode the slice based on the selected quantization parameter.

14. The system of claim 12, wherein the interface includes at least one of a Digital Video Interface (DVI), a High-Definition Multimedia Interface (HDMI) or a system frame buffer interface and the processor is to manage wireless transmission of the compressed video signal via at least one of an ultra-wideband channel or a wireless local area network (WLAN) network card.

* * * * *